(12) United States Patent
Cole et al.

(10) Patent No.: US 6,992,567 B2
(45) Date of Patent: Jan. 31, 2006

(54) ELECTRONIC LABEL READING SYSTEM

(75) Inventors: Peter H. Cole, West Lakes Shores (AU); David Malcolm Hall, Evandale (AU); Leigh Holbrook Turner, North Adelaide (AU); Richard Kalinowski, Carnoux en Provence (FR)

(73) Assignee: Gemplus Tag (Australia) PTY LTD, South Australia (AU)

( * ) Notice: Subject to any disclaimer, the term of this patent is extended or adjusted under 35 U.S.C. 154(b) by 216 days.

(21) Appl. No.: 10/148,477

(22) PCT Filed: Dec. 1, 2000

(86) PCT No.: PCT/AU00/01493

§ 371 (c)(1),
(2), (4) Date: Sep. 26, 2002

(87) PCT Pub. No.: WO01/41043

PCT Pub. Date: Jun. 7, 2001

(65) Prior Publication Data

US 2003/0067414 A1  Apr. 10, 2003

(30) Foreign Application Priority Data

Dec. 3, 1999 (AU) ................................ PQ4474
Mar. 8, 2000 (AU) ................................ PQ6084

(51) Int. Cl.
*H04Q 5/22* (2006.01)

(52) U.S. Cl. ................ 340/10.1; 340/10.2; 340/10.3; 340/10.34; 340/10.52

(58) Field of Classification Search ............... 340/10.1, 340/10.2, 10.3, 10.34, 10.52
See application file for complete search history.

(56) References Cited

U.S. PATENT DOCUMENTS

| 5,418,358 A | | 5/1995 | Bruhnke et al. |
| 5,499,015 A | * | 3/1996 | Winkler et al. ........... 340/572.2 |
| 5,689,239 A | * | 11/1997 | Turner et al. ............... 340/10.3 |
| 5,793,305 A | * | 8/1998 | Turner et al. ............. 340/10.34 |
| 5,973,606 A | * | 10/1999 | Maitin et al. ................ 340/676 |
| 6,222,480 B1 | * | 4/2001 | Kuntman et al. .............. 342/30 |

FOREIGN PATENT DOCUMENTS

| EP | 944016 A1 | 9/1999 |
| EP | 957442 A1 | 11/1999 |
| FR | 2 736 449 | 1/1997 |
| WO | WO 98/32092 | * 7/1998 |
| WO | WO 99/43127 | 8/1999 |
| WO | WO 99/12122 | 9/1999 |

* cited by examiner

*Primary Examiner*—Michael Horabik
*Assistant Examiner*—Scott Au
(74) *Attorney, Agent, or Firm*—Lowe Hauptman & Berner, LLP

(57) ABSTRACT

An electronic label reading system includes an interrogator including a transmitter and a receiver. The system also has a transmitter antenna connected to the transmitter for generating an interrogation electromagnetic field through which objects possessing code responding labels may pass. The code responding labels include label receiving antennas for receiving from the interrogation field a label interrogation signal, and generate label reply signals, and, from the label reply signals, reply electromagnetic fields. The system also has a receiver antenna connected to the receiver for receiving the reply signals from the label reply fields. The interrogation field and label reply fields provide a communication channel from the labels to the interrogator, and the interrogator signals to the labels condition information indicative of the condition of the communication channel.

38 Claims, 6 Drawing Sheets

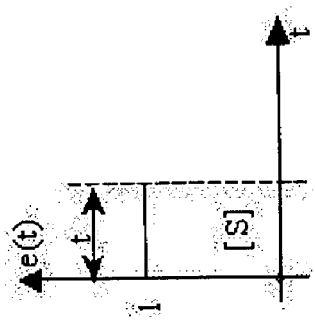
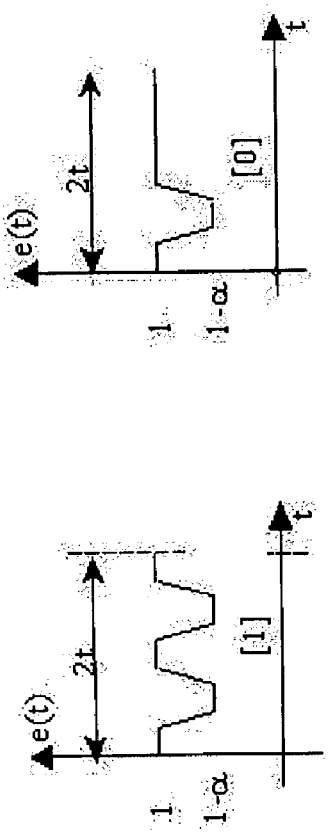
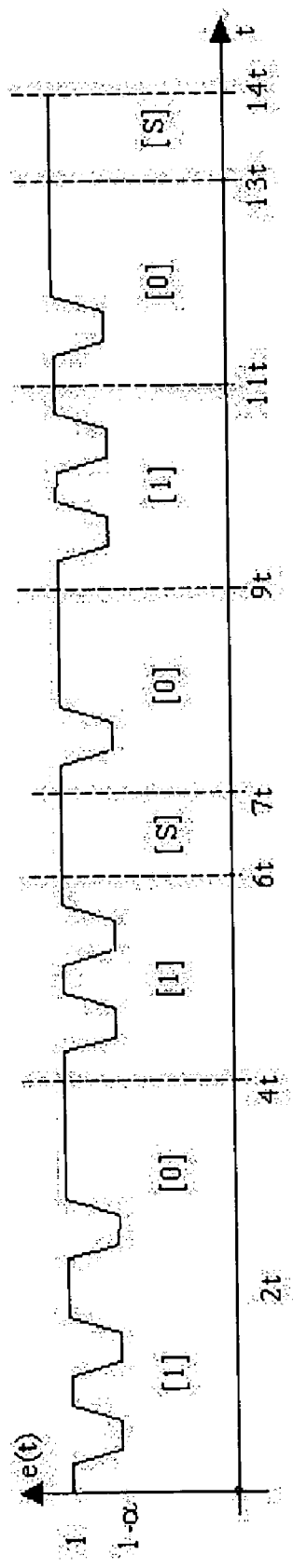
Fig 2c
Fig 2b
Fig 2a
Fig 2d

ELECTRONIC LABEL READING SYSTEM

FIELD OF THE INVENTION

The field of application of this invention lies in object management wherein information bearing electronically coded labels are attached to objects which are to be identified, sorted, controlled or audited by means of a process in which information passes between an interrogator, which creates an electromagnetic interrogation field, and electronically coded labels which respond by issuing a reply signal which is detected by the interrogator, decoded and supplied to other apparatus in the sorting, controlling or auditing process.

BACKGROUND OF THE INVENTION

Various instances of such systems are known, for example from Australian patent 658857 of Marsh and Lenarcic or Australian patent 664544 of Turner and Cole. In some variations of the system the interrogation medium may be other than electromagnetic, such as optic or acoustic.

The present invention is related to and may include developments disclosed in applicant's PCT patent applications AU92/00143, AU92/00477 and AU98/00017, the disclosures of which are incorporated herein by cross-reference.

Most of the features desirable in multiple read systems may be satisfied by allowing two-way communication between the interrogator and the labels. In contrast to simple schemes in which the interrogator merely provides an energising signal for the label, or a trigger signal telling the labels when to begin a sequence of replies, in this disclosure the interrogator, in addition to receiving and decoding replies from labels, can send to the labels a limited number of information bearing signals, and the labels can act upon those signals in simple but useful ways.

The are a number of factors which should be taken into account in the design of an RFID system, and in consequence in the design of a signalling system therefor. These are listed below.

Often labels may traverse rapidly through the field. This may create a need for fast data rates of communication from the label, and a need to ensure that the circuits used within the label are robust with respect to the variations in excitation levels, over the time available for its reading. There are consequences for the communication protocols which should be used in these situations. It is not guaranteed that all labels are within the field for roughly the same length of time.

Frequently, there is no guarantee that the labels are well coupled to the particular field orientation provided. In practical situations, there is a large range of field strengths to which labels are exposed. In addition, the small signal suppression effect must be taken into account in determining whether some label responses have been masked by other responses.

A wide variety of applications to which high frequency RFID labels are to be put have been identified in the market place.

Different applications place emphasis on different aspects of performance such as: reading range; reading speed; code capacity; manufacturing cost; time for which labels are in the interrogation field; throughput in terms of number of labels read per second; capacity to read against environmental noise; the need for extended label features such as combined theft detection and data recording capability; performance in a range of EMC environments; coping with a range of couplings between label and interrogator; and survival of the reading process during temporary field extinguishment or variation of field direction.

An interrogator—label signalling system must be designed with the flexibility that will cater, in an orderly way, for labels with the desirable range of functionality which meets these diverse operational demands.

SUMMARY OF THE INVENTION

The objectives of this invention are: to provide a possibly asynchronous solution for the item management problem; to cater for dynamic populations of labels; to provide for highly efficient and flexible multiple label reading protocols; to be fully EMC compliant in a variety of regulatory contexts; to cater for all label couplings with the interrogation field; to encourage and provide a place for technological innovation; and to permit operation of labels with advanced design features.

The present invention may provide operational compatibility between labels of a particular type from different manufacturers, as well as inter-operability in a single application between labels with different operating principles within the class of label for which this system is disclosed, as well as inter-operability within a single application between labels of the currently proposed type and labels of other types.

The present invention may also open a pathway for technological development by allowing places within the signalling system for future variation.

Further features of the current disclosure are: to include as acceptable, simple solutions which will be economical to manufacture; to be non-prescriptive in the specification of synchronous or asynchronous solutions; to avoid any need to maintain tight tolerances in circuit performance parameters; to define solutions to multiple label reading which will have the highest practical performance; and to introduce and provide a place for advanced features known to be of use in the market place.

In all cases it is believed that the system should be sufficiently defined to meet the compatibility and inter-operability objectives stated above, but flexible enough that the market will have a choice of functional and manufacturing implementations.

Labels to which the currently described system is suited may be designed for use where the application calls for low cost and high speed reading for labels moving rapidly through the reading environment. Varieties of such labels may be suitable for applications in which random aloha anti-collision principles are satisfactory, and for situations in which time-efficient deterministic detection of the data within of all labels, present in an interrogation field, is required. These divergent requirements may be catered for by proposing a tree-structured signalling scheme.

To achieve interoperability, and to cater for a label rich environment, that all labeling systems should be reader talks first. For this reason, this disclosure describes such a system.

The principal methods by means of which interoperability may be achieved is to have different categories of labels selectively respond to differently structured wake up signals, while ignoring the wake up signals that existing types of labels respond to. In addition, various varieties of labels for which this signalling system is designed may, when necessary, be distinguished in both their wake up and subsequent behaviour by means of parameters attached to the generic wake up command of this disclosure.

In this disclosure the 13.56 MHz CW RF field may supply the label with operating power via magnetic induction in coupled antennas. This signal may be amplitude modulated when data communication from the reader to the label is required. The modulation depth and data transfer rate, during reading and label programming, are system parameters which may be optimised with respect to the requirements of power management, the target operating range of the passive label, and prevailing radio spectrum regulations.

The signals issued by the interrogator may be divided into four classes, known accordingly as wake up signals, next slot signals, acknowledgement signals, and the label programming signals. All of these signals will be discussed in detail later in the disclosure, but it may be said here that the wake up signals are concerned with the reader talks first feature of allowing either already powered labels to enter into the reply generation process or are concerned with the commencement of programming of the label already known to be physically isolated. The next two types of signal, which are known as either next slot signals or acknowledgement signals, may be signals issued by the interrogator to provide to the labels information about the condition of the communication channel, between the interrogator and the label, as seen by the interrogator. The label programming signals perform the function which their name implies.

An understanding of the invention will also be enhanced by describing for the labels various modes of operation. The first such mode to be named is powered-inactive mode, which is a condition in which the label enters when it has first received energising power but has not yet received permission, under the reader talks first protocol, to commence any replies. The second mode of interest is reply mode in which a label generates random but in most cases approximately slotted replies at either a default time average interval or an interval which has varied from the default value as a result of the label having received other signals. The third mode of interest is the silent mode which is a mode in which a label which has previously replied has now ceased replying.

The conditions for a label entering silent mode will be discussed later, but it is noted here that they do not include an acknowledgment from the interrogator that a reply has been received and correctly decoded. Such acknowledgment signals may not occur.

The next mode of interest is called programming mode which is a mode entered by a label after it has replied and has received from the interrogator a signal that it is to be isolated for programming. Corresponding to the previous case, the conditions for a label entering programming mode will be discussed later, but it may again be noted here that they do not include signals from the interrogator that the label has been read and correctly decoded. Such signals may not occur.

Corresponding to the programming mode for one label is a withholding mode for other labels. Labels in this mode may, if they are not already silent, withhold their replies while another label is being programmed, and may, at the conclusion of programming, upon an appropriate signal from the interrogator, re-enter either the replying mode or the silent mode from which they were most recently moved into withholding mode.

Finally, for situations where the interrogation field must be varied in direction so that labels of all orientations must be read, there is a dormant mode in which a label can remain for a limited period of time after it has been energised, but is no longer receiving energising power. In the dormant mode the label retains, in a volatile memory of sufficient endurance for operation of that variety of multiple label reading system, key parameters regulating its replying operation, so that if power is restored to the label within an appropriately short time, it can correctly re-enter either the reply mode or silent mode in which it was operating before it became dormant.

As an aid to efficient utilisation of time within the generation and detection of replies, labels may issue replies on a semi-slotted basis. This means that labels may generate internally an estimate of how long a label reply will occur, and may maintain internally a count of how many of these label reply periods have elapsed since the issuing of a wake up signal, and may also maintain internally a generator of random digital signals which may determine, for each label, into which time slot it will insert its reply. The use of reply slots in this way may minimise the occurrence of partial interference between replies, may ensure that where reply collisions occur they are more or less complete collisions, and also that there may generally be replies completely free of interference from other replies.

The signals of this invention which may be recognised and acted upon by the label after a wake up command has been recognised and acted upon fall into two classes. They are either next slot signals or acknowledgement signals.

The next slot signal may be generated and issued by the interrogator at the end of period, which may be less than the period for a full reply, in which the interrogator has noted it has received a number of colliding replies, or has received no reply but has internally determined that a time sufficient for a reply to have commenced has elapsed.

The next slot signals which may be used in some embodiments of this invention provide both information to the labels as to the nature of the communication channel as seen by the interrogator, and may also imply commands as to what the labels should do to promote efficient multiple label reading in the light of that information. These next slot signals are issued shortly after the commencement of a potential reply slot, instead of at the end of such a reply slot. They may cause a label which is currently replying to abandon its attempt at replying, and all labels to re-commence timing a new reply slot. A benefit of having the next slot signal is that time is not wasted by the interrogator listening to an extended period of silence when no labels are replying, and time is not wasted by the interrogator in listening to two or more replies colliding for the full duration of those replies, when it can frequently be determined early in a required time slot that a collision is occurring.

The acknowledgement signals may be generated and issued by the interrogator at the end of each period in which the interrogator has noted it has received a reply or received an attempt at a reply.

The acknowledgement signals may have several functions. They may provide to all labels a commentary on the nature of the communication channel as perceived by the interrogator, namely empty of reply, containing what might be a single reply, or containing colliding replies, and at the same time they may contain implied commands as to what the labels should do in response to such acknowledgement signals. As an example, if an interrogator has received too few replies, it may send that one of the variety of acknowledgement signals which causes the labels to reduce the mean time between replying, so the replies become closer together. If the interrogator has received too many collisions, it may send another of the set of acknowledgement signals, that one implying that the labels should spread their replies further so the collisions become less frequent.

There are other functions for the acknowledgement signals which will be discussed in more detail later. What is clear is that the communication channel reports provide a basis for labels to keep their own internally timed estimates of potential reply time slots in close agreement, even though those estimates may depend in part upon within-label oscillators of divergent frequencies.

In some embodiments of the invention, neither next slot signals nor acknowledgment signals are used, and labels may retain their estimate of timing either on an exact basis by obtaining by frequency division from the interrogator carrier signal a low frequency timing signal which is synchronous therewith and is therefore common to all labels, while in some other embodiment of the invention the time slots may be determined on an approximate basis by oscillators internal to the labels. In the later case perfect matching between estimates of time positions of time slots by different labels may not occur, but the differences will not be too great if wake up signals from the interrogator are received sufficiently frequently.

When next slot or acknowledgement signals from the interrogator are used, the labels may make, in addition to the wake up signals, use of those next slot or acknowledgement signals in establishing their estimates of the beginning of each reply slot time slot, and a high degree of correspondence between time slots and counts of time slots between different labels will occur, despite small variations in the frequencies of the within-label oscillators used for timing.

All the systems described in this disclosure are for reader talks first labels. Among the principles of operation which this invention seeks to support are what will be called non-terminating aloha, adaptive round slotted terminating aloha, and kernel-based labels for field direction variation.

According to the present invention there is provided an electronic label reading system including:

an interrogator including a transmitter for generating an interrogation signal and a receiver; a transmitter antenna connected to the transmitter for generating from the interrogation signal an interrogation electromagnetic field through which objects possessing code responding labels may pass; the code responding labels including receiving antennas for receiving from the interrogation field a label interrogation signal, the code responding labels being configured to generate label reply signals and, from the label reply signals, label reply electromagnetic fields; and a receiver antenna connected to the receiver for receiving the label reply signals from the label reply fields, the receiver being configured to detect and decode the label reply signals. The interrogation field and label reply fields provide a communication channel from the labels to the interrogator. The interrogator is configured to transmit reply enabling signals to the labels before the labels are enabled to reply. Each label reply signal contains a precursor portion separated from a remaining portion of the label reply signal by a predetermined gap. Further signals from the interrogator determine which labels of all labels present in the interrogation field that have replied with the precursor portion are enabled for further communication between themselves and the interrogator.

BRIEF DESCRIPTION OF THE DRAWINGS

Preferred embodiments of the present invention will now be described with reference to the accompanying drawings wherein:

FIGS. 2A, 2B, 2C and 2D show forms of signalling from the interrogator to the label;

DETAILED DESCRIPTION OF THE PREFERRED EMBODIMENTS

Figure 1:
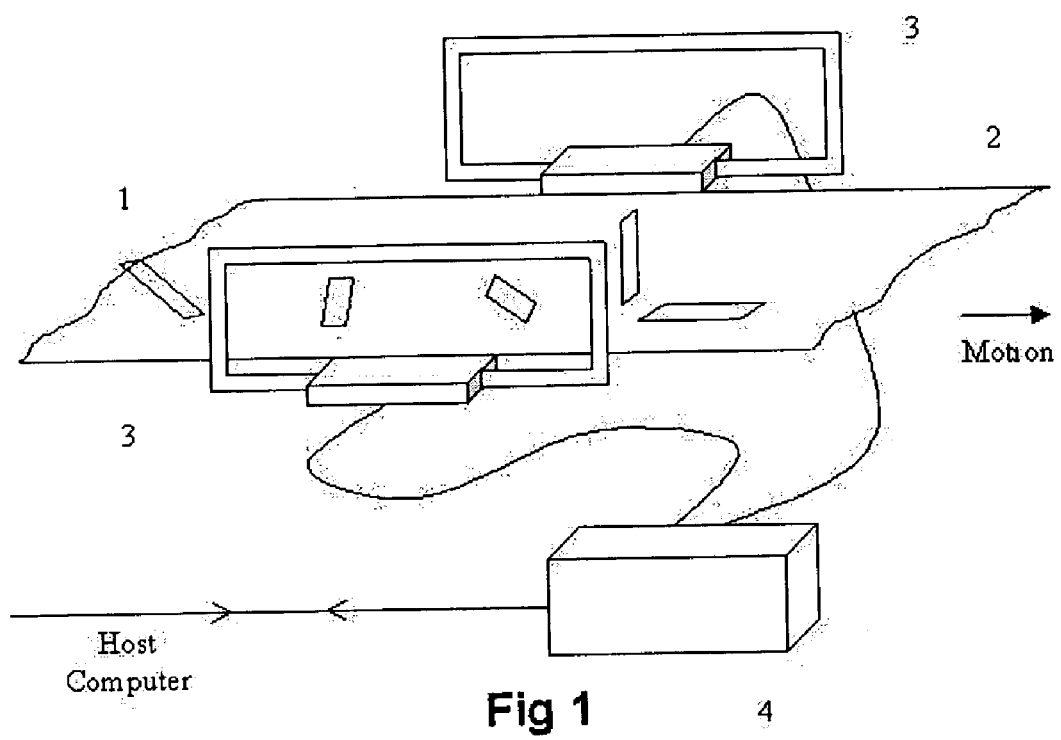
FIG. 1 shows a number of electronic labels moving through a region scanned by an interrogator.

FIG. 1 shows in simplified form a preferred embodiment of the invention wherein a number of differently oriented electronic labels 1 are attached to objects, for convenience not shown, which are being transported on a conveyor 2 through an interrogation field region established between interrogation antennas 3 which are energised by a transmitter in interrogator 4 and return replies to a receiver therein. After the labels have been read, according to procedures to be described, information on the reading is passed over a data line to a host computer, not shown.

Notable in this structure is the fact that the labels are firstly at various distances from the interrogation antennas and secondly are variously oriented. Both of these factors will influence the degree of coupling to the generally magnetic interrogation field. Thirdly the labels are moving in and out of that field as the interrogation process proceeds.

As the labels enter the field they receive energising power and enter a mode known as powered-inactive mode in which they will, in accord with the reader talks first protocol, not reply until they have received an appropriate wake up signal from the interrogator.

For the definition of the waveforms used in one or more embodiments of the invention of the wake up signals, next slot signals, and acknowledgement signals, use is made of a basic waveform for the envelope e(t) of the interrogator powering signal which is shown in approximate form in FIG. 2, and is qualified by parameters contained in Table 1.

The parameter $\alpha$ is known as the modulation index, and the parameter t is known as the base period.

Three variants of signalling, the first two being known as broadband signalling but having different values of $\alpha$, and the third being known as narrowband signalling, are defined. The parameter values for all varieties of signalling are defined in Table 2 below.

TABLE 1

| PARAMETER | BROADBAND 20 | BROADBAND 80 | NARROWBAND 80 |
|---|---|---|---|
| $\alpha$ | 20% | 80% | 80% |
| t | 14 µs | 14 µs | 175 µs |

The different forms of signalling are suited to different applications and to different electromagnetic compatibility contexts. The narrowband 80 signalling is for operation under for the existing FCC regulations at long range. The broadband 20 signalling is suited to high speed reading applications under the existing FCC regulations. The broadband 80 signalling is suited to all applications under the ETSI regulations and or the FCC regulations which will result if petition for change of this regulations currently before it is granted.

In a preferred embodiment, the fine detail of the pulse shapes is defined more completely in FIG. 2 and Table 2 below.

TABLE 2

| PARAMETER | BROADBAND | NARROWBAND |
|---|---|---|
| $t_s$ | 2.8 µs | 0 µs |
| $t_t$ | 1.4 µs | 50 µs |
| $t_d$ | 5.6 µs | 75 µs |

An advantage of the particular timings for pulses in broadband signaling given in Tables 1 and 2 is that they provide for nulls in the spectral response of the signaling scheme to occur just inside the frequencies at which both the petition-granted FCC rules and the current ETSI rules require substantial lowering of the sideband levels of the interrogation powering signal which are created by its modulation.

The wake up signal may be presented in various forms which arise from firstly the different requirements for broadband signalling or for narrowband signalling, and secondly from the desirability of defining a wake up signal without parameters and a wake up signal with parameters.

Figure 4A:
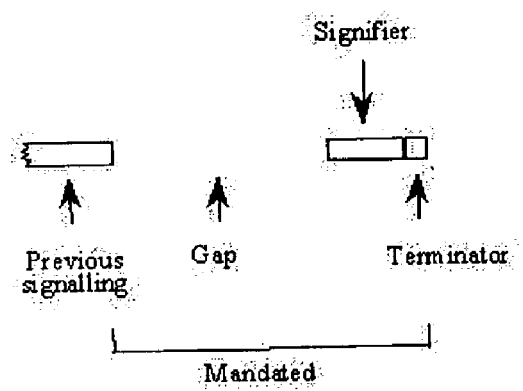
FIGS. 4A and 4B show details of a label wake up signal.

A wake up signal may be issued either with following parameters or without following parameters. FIG. 4A shows a wake up signal without parameters and FIG. 4B shows a wake up signal with parameters.

The wake up signal without parameters consists of a signifier (of a wake up signal) followed by what is called a terminator. Both of these concepts will receive further definition below.

The wake up signal with parameters consists of the same signifier, followed by various parameter strings, the strings being separated by a separator, and eventually terminated by a terminator.

Figure 4B:
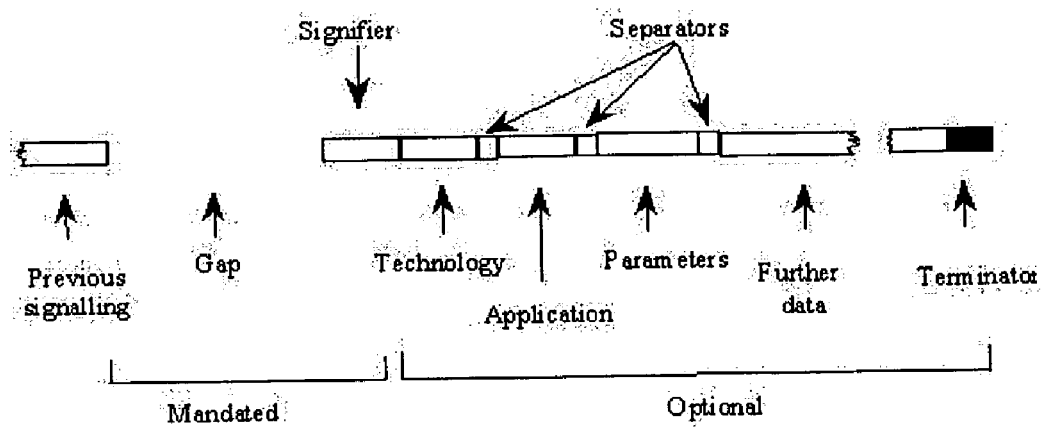

In FIGS. 4A and 4B the terminology terminator or separator has been used for the symbol which either terminates a data field or separates two data fields, but it is intended that the same signal may be used in each case.

Wake up messages with parameters consist of the generic wakeup signal, and optional words for technology, application code, and operating parameters. They are optional in that the reader may or may not send any additional words. The separating character is used to delimit the three words, or mark the absence of any given word.

The generic wakeup signal is just a binary 1. The optional words follow the general wakeup, and are "stretchable". This means they are serial words that are of indefinite length, and marked by a terminating character, or separator, which is just an absence of a gap where there should be one, if a legitimate binary symbol is being sent.

A possible ordering of the three optional specifiers is as shown in FIG. 4B. The signalling scheme by means of which the wake up signals and parameters may be supplied has already been illustrated in an idealised form in FIG. 2. It is based on a method of signalling of either binary ones or binary zeros or terminator symbols.

Signals are sent in multiples of a basic time interval t, defined for broadband and narrowband signalling in Table 1. It takes two units of t to signal a one or a zero, and only a single unit of t to signal a terminator or separator. The signalling waveforms for a binary one, a binary zero and a separator are shown in FIGS. 2a, 2b and 2c respectively.

FIG. 2d shows the waveform for signalling the binary string 101 followed by a separator, and then the binary string 010, followed by a terminator.

The signifier for a wake up signal with or without parameters is a binary one as defined in FIGS. 4A and 4B.

In addition to the parameters listed, there are some situations, for example when either one or many labels are to be programmed as soon as they are woken up, a data stream of considerable length might also be required to be supplied. So we envisage, for the situation when some or all labels in the field are to be programmed, an optional fourth data field which could follow the wake up signal and which could contain, for example, programming instructions and programming data.

There is the additional understanding in relation to the wake up signal that if no parameters follow the application field, the application field may also be absent, and if it is absent, the labels are assumed to be general purpose labels.

In addition to the material already stated, there are some further understandings which relate to the basic level of the proposed standard. Some of these have already been illustrated in FIGS. 4A and 4B, but deserve explicit mention.

The first is that a wake up signal is preceded by a significant period in which there is no signalling.

The definition of any wake up signal for the base level of the signalling casts a shadow on all other levels of signalling in that there is a requirement that none of the other signals should be capable of being misinterpreted as a wake up signal.

The system allows for the general or selective wakeup of labels with the use of an application code specifier. This word is signalled in the same manner as the technology specifier; it is stretchable, and delimited with the above mentioned separator.

The system is extensible in that the application codes may be of indefinite length.

At present, four application codes are defined according to Table 3 below.

TABLE 3

| APPLICATION FIELD | APPLICATION |
|---|---|
| 0 | General purpose labels |
| 1 | Airline baggage labels |
| 2 | Laundry labels |
| 3 | Video rental labels |

The wide range of practical applications, and the variability of the regulatory environment, lead to a range of contexts within which EMC constraints must be applied.

One may identify four principal contexts, listed below in the order of increasing compatibility with the requirements of HF RFID systems. These are:

the current (as at February 2000) FCC regulations;

the regulations of the FCC which would result if a pending petition to approximately harmonise with the ETSI regulations is granted;

the current ETSI regulations defined by ETSI 300 330;

a close range or screened reading or programming environment.

In all of these regimes the regulations are defined in terms of a quasi peak detector instrument, and a spectral mask, with a measure of discretion left to both the manufacturer and to the test house in specifying some of the detail.

Normally the downlink replies from the label to the interrogator are sufficiently weak for them to comply automatically with generic EMC constraints. Thus the downlink signals are not a concern.

In the different applications and operating principles for labels which this proposal intends to cover, different demands are placed on the nature and frequency of signals required in the uplink from the interrogator to the labels.

When the analysis is done the results, for each discrete uplink signal required, are expressible in terms of the frequency (number of times per second) with which that uplink signal can be offered.

The results for two types of uplink signalling, which we defined above as Broadband 20 and Broadband 80 signalling, and narrowband signalling are listed in Table 4 below.

The values in Table 4 below allow the calculation, for both Broadband 20 and Broadband 80 signalling, of the number of times per second with which those signals may be presented.

TABLE 4

| MODULATION INDEX | PRESENT FCC | PRESENT ETSI |
|---|---|---|
| 80% | 85 pps | 4,000 pps |
| 20% | 180 pps | >10,000 pps |

Such results, taken with the requirements of the application, will guide the user in making a choice between the range of allowed operating principles to be defined under this standard.

A result which emerges from the above table is that there is a logical need for each of the embodiments defined in this disclosure.

In a preferred embodiment of this invention, incorporating what we will call the intelligent interrogator, the interrogator may be furnished with an ability to maintain a history of its issuing of signalling pulses, and to determine, from that history, the electromagnetic compatibility consequences of its recent signalling, so that the frequency of signalling pulses may be temporarily reduced if this is necessary to maintain the interrogator signals within regulations.

Figure 3:
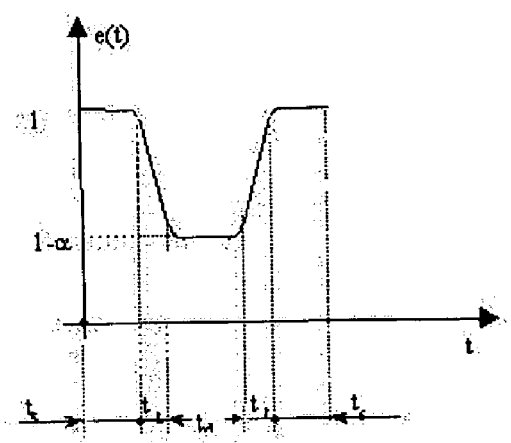
FIG. 3 shows details of a signalling waveform.

In the optional fourth data field which forms part of the wake up signal calling for label programming, considerable data may need to be transmitted, and the demands of such large data transmission, in relation to electromagnetic compatibility constraints, may require variation of the signalling from that defined in FIGS. 2 and 3.

In a preferred embodiment of the invention, such variation can consist of inserting, between the binary symbols of the data, spaces in which the interrogator power is unmodulated. The spaces may be sized so that they are shorter than the space which should precede a wake up command, but sufficiently long so that the spectrum of the data carrying signal is significantly modified to remove spectral peaks and to provide the required signalling energy with a low and uniform distribution.

One spacing policy which is of use in this endeavour is that of chirping the gaps. By this is meant steadily increasing the gap size as one progresses through the data stream. To allow this policy to be adopted, the definition of a terminator may be modified during the programming data stream, so that it consists of the sequence of two events, one a small gap followed by a significantly larger gap. In a preferred embodiment the larger gap has three times the size of the smaller gap.

The initial response of labels to which this invention is suited to a wake up signal depends upon and is defined in the two separate cases below.

Upon receiving a wake up signal without parameters, labels which provide replies on a simple un-slotted non-terminating basis will begin replying at self-timed but varying intervals, and will continue to reply a long as they are in the interrogation field. Such labels will not expect, and will ignore, any further signalling for the interrogator, except for a further wake up command.

Upon receiving a wake up signal with parameters defining that programming is to occur, such labels will enter programming mode, and if the programming mode signified is within their capability, will receive data, and program that data into memory. At the conclusion of the programming period, the labels will begin their normal random reply sequences, using the freshly programmed data.

Figure 5:
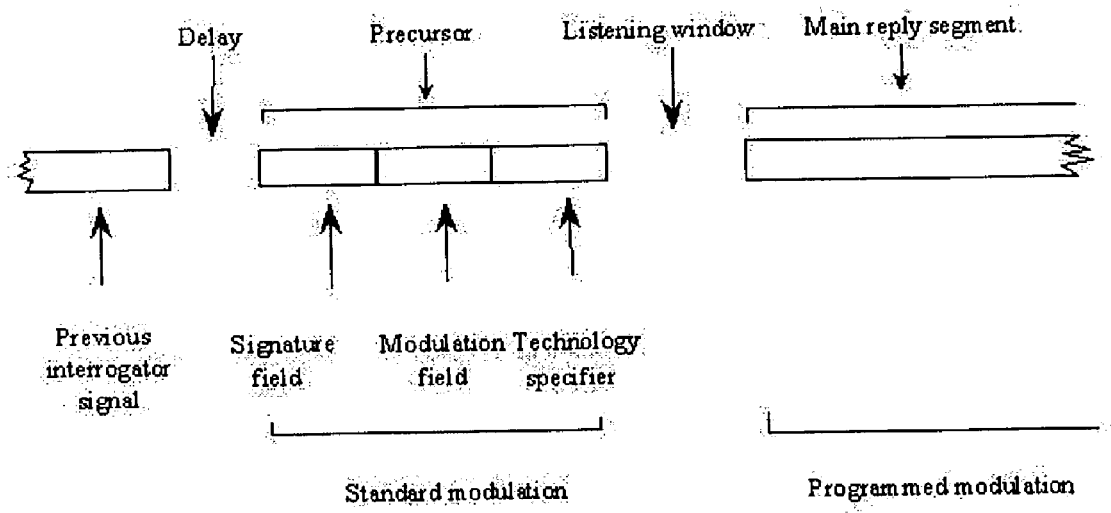
FIG. 5 shows detail of an initial label response.

Upon receiving a wake up command of any type, labels which provide replies on a slotted terminating basis will provide, within their own self-selected reply slot, an initial label response as illustrated in FIG. 5.

The reply may be timed to begin after a delay from the previous interrogator signal. It may consist of a precursor response in which a standard modulation, to be defined below, is used, followed by a gap in signalling, that gap being followed by the main reply segment. The reply message may contain an ID, or other application specific information.

The precursor response may consist of a signature field, a modulation field, and a technology specifier. An illustration of all of these fields is provided in FIG. 6.

The signal from the label may obtained by amplitude modulation of the oscillation in the label tuned circuit. The high and low portions of the waveform of FIG. 6 correspond respectively to high and low amplitude oscillations in that circuit. As the label will be oscillating strongly before the modulation starts, the initial level of the waveform in FIG. 6 is high.

Figure 6:
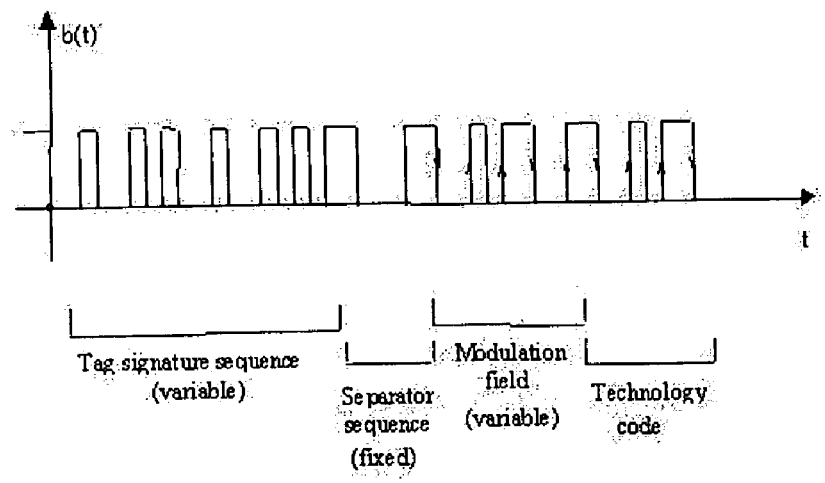
FIG. 6 shows a label precursor response.

FIG. 6 illustrates one example of a single label signature sequence. All such sequences occupy sixteen time units, and are followed by a fixed terminator sequence using six time units, the latter being followed by a five bit Manchester code occupying ten time units, and a further four bits of Manchester code occupying eight time units. The rules defining the structure of the three fields are as follows.

The start of signalling in the signature field is marked by a high to low transition. After that transition there are sixteen time periods in which the levels are chosen at random, subject to the condition that there are single, i.e. isolated, high level periods, and either single or double low level periods; until sixteen time units have elapsed.

The signature field may be of use in speeding the overall interrogation process, through providing a mechanism for approximate collision detection. Rigorous collision detection may also be performed within further operations of the system.

In an alternative embodiment the precursor data may be amplitude modulated onto a sub carrier, using for each binary digit a period of modulation of that sub carrier followed or preceded by a period of no sub carrier, the following or preceding being determined by the content of that data bit.

The rules defining the structure will be violated when precursor signals containing different information content are superimposed, especially after amplification, clamping and limiting to equalise the excursions which follow transitions.

The five-bit Manchester code is decoded by the label to ascertain which one of its allowed modulations will be used in the remainder of the reply.

The technology specifier echoes the technology specifier in the uplink, or identifies the label technology in the case of wake up messages with unspecified technologies.

The precursor may also be structured to contain information describing label excitation level, thereby making collisions between replies from labels which experience different excitation levels more evident.

The reply precursor is, as shown in FIG. 5, followed by a gap in signalling from the label. This gap, known as a listening window, allows the label to listen sensitively for signals which the interrogator may decide to send to the label upon examining of the label precursor response.

In the portions of the label response preceding the listening window, a standard modulation may be used. In the main reply segment the modulation employed is from an allowed set of modulations for that label, and may be specified in the modulation field.

In a preferred embodiment, the listening window may be 150 μs+/−25 μs.

In a preferred embodiment of the invention, the label circuit may be designed so that it is either in a potential reply generating mode, or during the listening periods as described above, in a listening mode, in which its circuits are optimised for detection of the possibly shallow modulation employed in the downlink signalling. In such a label, the rectifier section of the label circuit may be provided with a reservoir capacitance, the value of which may be changed by switching within the label, so that when the label is replying, a large value is in circuit, and when the label is in listening mode, a substantially smaller value is in circuit.

There is an important advantage conferred by the provision, in the signaling scheme, of a listening window, the position of which is known to both the interrogator and the labels. One of the problems in signaling to the labels by means of broadband signaling of such shallow modulation depth as 20% as is contemplated in what we have called in this disclosure Broadband 20 signaling, is that adjacent labels when replying can be sufficiently strongly coupled to one another for the reply of one label to be misinterpreted by another label as a downlink signal from the interrogator.

The provision of such a signaling window confers two advantages. In the first place a label will not receive signals while it is itself is trying to generate a reply, and signals do not need to be detected in the face of interference from the labels own reply generating mechanism. In the second place, in a slotted reply system as described in this disclosure, even one where the labels calculate for themselves using analog circuits the position of a listening window, the position of that window will be calculated with sufficient accuracy for all labels to remain silent during all listening windows, so the inter-label interference described above is of no consequence.

Provided the interrogator does not issue during the said listening window a signal, the reply process will continue to the issuing by the label of the main reply segment shown in FIG. 6.

It is proper to consider further activity in the reply process within what is called a protocol level.

This disclosure identifies different technologies employing the different protocols in which labels reply with: (i) slotted and un-slotted responses; (ii) terminating and non-terminating responses, with decimal representations which may be as in Table 5 below.

TABLE 5

| PROTOCOL FIELD | PROTOCOL DESCRIPTION |
| --- | --- |
| 0 | Non-slotted non-terminating aloha |
| 1 | Label-slotted terminating protocol |

Detailed descriptions of the protocols appear below.

In non-slotted non-terminating aloha protocol labels, once woken up, reply at random self-determined intervals as long as they continue in the field. Operating parameters may not be used. Details of modulation, message structure and programming interface may be as in the referenced disclosures, or the programming interface may be as for the label-slotted terminating protocol described below.

In the label-slotted terminating aloha protocol, the only occasions when label operating parameters are required is when a label or group of labels, immediately upon being woken up, is required to have their reply data or label behavior controlling parameters temporarily set or more permanently re-programmed.

In that circumstance the label operating parameters may consist of five or six bits, and may have the structure and purposes fully defined in discussion relating to Tables 7 and 8 below for acknowledgment signals, but subject to the understanding that the strength parameter, also to be defined in discussion of Table 8, has the value zero.

This correspondence in form between label operating parameters and parameters of acknowledgement signals allows for simpler design of internal label circuits.

In the reply phase after the labels have been woken up and begin to reply, the label-slotted terminating protocol is based on a continuing dialog between interrogator and labels. That interrogator label dialog is illustrated in FIG. 7, and is explained further below.

Upon wake up labels do not necessarily reply immediately, but begin self-timing a number of reply rounds and randomly chosen reply slots within those rounds.

The time duration of a reply slot is dependent upon the model of label, and the number of slots within a reply round is dependent upon initial label programming, but can be modified by interrogator instructions.

Figure 7:
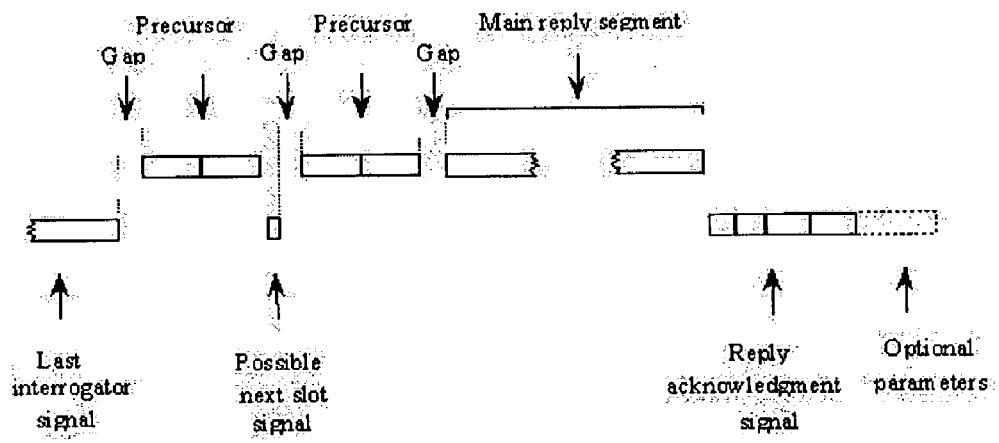
FIG. 7 shows an interrogator label dialog.

When a label begins to reply, its reply commences, as shown in FIG. 7, at a particular delay time after the last interrogator signal. As has already been explained at the initial response level, the first action of a label is to issue the label precursor response already discussed.

It should be realised that, as labels determine their reply positions in a round on a random basis, there may be none, one or more than one reply precursor occurring after the initial delay. The case when no reply occurs is readily detectable by the interrogator. Features have been built into the reply precursor to make the occurrence of more than one reply also, in most cases, readily detectable by the interrogator.

In the case when no reply occurs, it is unproductive for the interrogator to continue to listen for a reply for longer that the time taken by the label to issue the precursor, and it is also unproductive for the interrogator to continue to receive a reply when collisions are occurring.

For those reasons the interrogator may, during or after the precursor, issue a next slot signal to the labels. The next slot signal may take the form of a single modulation dip of the type defined in FIG. 3. It is clearly distinguishable from the wake up command, and from the acknowledgment signals to be defined later.

On the detection of the next slot signal, all labels may cease their timing of a reply slot, and commence the timing of a new one, within which other labels may reply. FIG. 7 has shown a single occurrence of such a result, after which a reply, from a different label, was allowed to proceed to completion.

Figure 8:
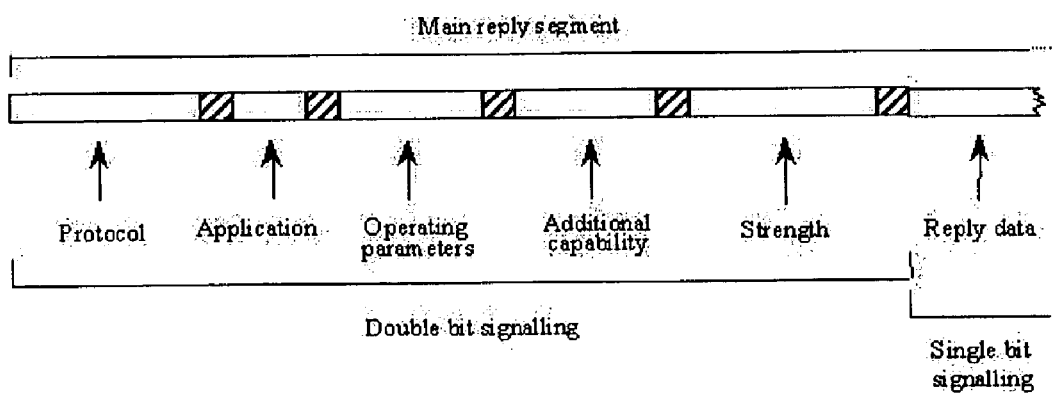
FIG. 8 shows the structure of a main reply segment.

Important to the interrogation process is the presence of particular data, shown in FIG. 8, in the main label reply segment.

The particular data referred to is a report, generated by the label, of the excitation field in which the label finds itself. This report is present in the fifth section, labelled strength, of the main reply segment shown in FIG. 8.

Upon the completion of the reply shown in FIG. 7, a reply acknowledgement signal may be issued by the interrogator. The structure of the reply acknowledgement signal is shown FIG. 9 below.

Figure 9:
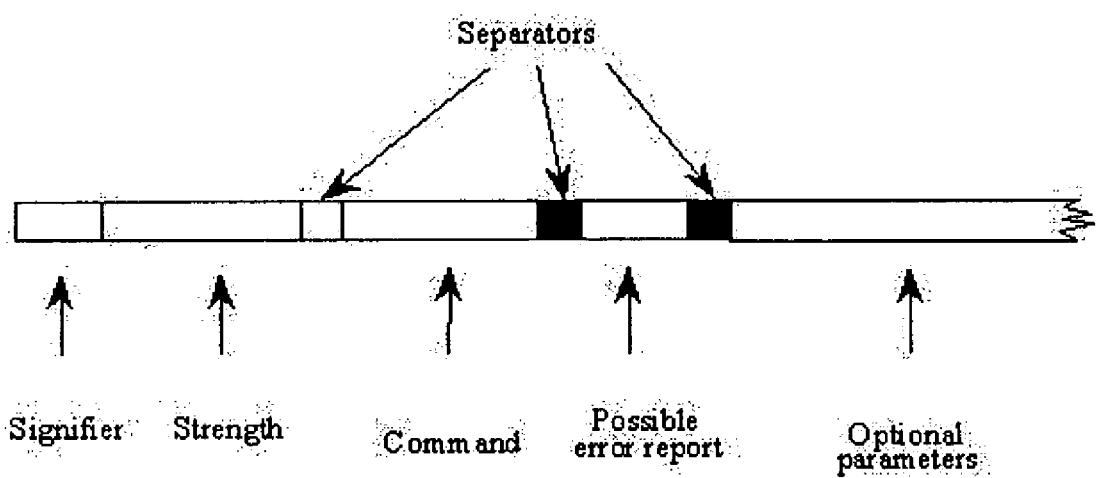
FIG. 9 shows a reply acknowledgement signal.

As shown in FIG. 9, the label reply acknowledgment signal may begin with a signifier, which may be chosen to be recognisably different from the signifier of the wake up command, and to the next slot signal.

Then may follow, in a strength field, an echo of the excitation level reported by the label in the reply. Then may follow, in a command field, a command from the interrogator. Then may also follow, in an error field, a report of an error in the decoding of the reply signal. Finally, a set of parameters relevant to the preceding command may follow in a parameter field. Various rules may govern the size and availability of the fields, so that compact signalling is usually possible.

In a preferred embodiment in the strength field there are either one or three binary digits. The first digit indicates (by a binary one and zero respectively) whether or not the label reply contains an indication of its internally measured strength of excitation. If the first digit is zero, there are no other digits. If the first digit is non-zero, the following two digits represent the internally measured strength of excitation, with 00 representing the lowest level of excitation.

In that preferred embodiment the response of a label to receiving and acknowledgment signal with a strength field is that the label will cease replying if the strength field received by the label matches the strength field reported in its just completed reply. This action may be taken before the interrogator has determined whether or not the just received reply can be correctly decoded.

The command field may be of three, five or six binary digits in length. In this embodiment the three digit commands are concerned with management of the interrogation process, without making changes in label selection, label data content or method of encoding replies. The five digit commands are concerned with changes to the modulation used in the main reply segment. The six bit digit commands are concerned with selection of labels, or of label data for replying or for programming.

The functions of the three bit commands may be as set out in Table 6 below.

The "spread out" and "close in" commands may cause all labels to increase or decrease the number of slots in a reply round by a factor of two. After receipt of this command, labels may recalculate their random positions in the new expanded or diminished round. Effectively a new round is begun.

TABLE 6

| COMMAND FIELD VALUE | COMMAND |
| --- | --- |
| 0 | No command |
| 1 | Spread out |
| 2 | Close in |
| 3 | Next round |
| 4 | Reserved |
| 5 | Reserved |
| 6 | Reply now |
| 7 | Complete reset |

The "no command" allows labels to continue to reply using the existing round size and planned reply positions, and gives time for the last reply to be decoded, so the correctness of the code can be checked.

The "next round" command forces a recalculation of reply positions by all labels without change of rely round size.

The "reply now" command is intended to cause any label which is still waiting to reply to reply in the next slot. If no replies are then received, it is clear that all labels have been read.

Alternatively, if labels are designed to take note of how long they have been in the field, this command might, for that design of label, cause only labels which have been a predetermined and previously programmed length of time in the field to reply at once. Effectively for such labels we are temporarily setting a round size of one slot. This last variation is preferred, as it creates useful opportunities for improved system performance through label design without complicating the signalling.

The "complete reset" command causes all labels to resume replying as if none had been read. It is useful when we wish, for robustness of data collection, to repeat an entire data collection procedure.

The function of the five-bit commands within the acknowledgment signal is to specify that all labels should use henceforth a new modulation scheme selected from the possible candidates shown in Table 7 below.

The six bit commands may be concerned with the selection of label or reply data for either replying or for programming.

In the six bit commands the leading bit is always one. Proceeding form right to left, the next bit specifies, indicates by a zero or a one respectively, whether the label serial number is or is not to be included in replies.

The next bit indicates, by a zero or a one respectively, whether labels or label data is being specified for replying or for programming.

TABLE 7

| SUB-CARRIER FREQUENCY | MODULATION | CYCLES PER BIT | DATA RATE IN BITS/S |
| --- | --- | --- | --- |
| Direct | Manchester | NA | 53 |
| 53 | DQPSK | 8 | 13.25 |
| 106 | DQPSK | 8 | 26.5 |
| 212 | DQPSK | 8 | 53 |
| 53 | DQPSK | 4 | 26.5 |
| 106 | DQPSK | 4 | 53 |
| 212 | DQPSK | 4 | 106 |
| 53 | DPSK | 8 | 6.625 |
| 106 | DPSK | 8 | 13.25 |
| 212 | DPSK | 8 | 26.5 |
| 53 | DPSK | 4 | 13.25 |
| 106 | DPSK | 4 | 26.5 |
| 212 | DPSK | 4 | 53 |
| 53 | DPSK | 8 | 26.5 |

TABLE 7-continued

| SUB-CARRIER FREQUENCY | MODULATION | CYCLES PER BIT | DATA RATE IN BITS/S |
|---|---|---|---|
| 106 | DPSK | 4 | 53 |
| 212 | DPSK | 2 | 106 |

The last three bits may specify, for command field values 0 to 6, the addressing mode being selected or, for command field value 7, the function being selected, in accord with the entries in Table 8 below.

When a six bit command which indicates a label or labels is to be programmed is issued, it will cause the label (or labels), for which the strength field of the command matches the labels own most recent excitation strength estimate, to prepare for a programming operation. All other labels may enter a mode in which replies are temporarily suppressed. It is then possible to signal to labels at any time, and not wait for slots to complete.

TABLE 8

| COMMAND FIELD VALUE | COMMAND |
|---|---|
| 0 | Special bit mode |
| 1 | Page mode |
| 2 | Whole memory mode |
| 3 | Address range mode |
| 4 | Address content mode |
| 5 | Controlling parameter mode |
| 6 | Reserved |
| 7 | End of programming |

If no error is subsequently signalled in the following field of the acknowledgment signal, the effects just described continue in operation. If, however, an error is signalled, the programming command has no effect, i.e. it is as if a null command had been entered, and in addition the labels for which there was a match of signal strengths continue replying.

When a programming command is issued, the programming data is drawn from the optional parameters which occur at the end of the wake up command or the acknowledgement command as the case may be.

At the conclusion of programming, the previously selected label or labels will begin replying.

If a programming command applies to one label through its having a non-zero strength field, the reply is at once. If the programming command applies to more than one label through its having a zero strength field, the reply is at random intervals, using the round size previously in force. This will continue until either a wake up command or an acknowledgement signal selects through the end of programming command, a wider group of labels for replying.

In a preferred embodiment the effect of this command will be dependent upon the presence or otherwise of an immediately following error report. If there is no immediately following error report, the effect is to instruct the label just programmed, and all other labels which for which the replies had been temporarily suspended during programming, to continue to reply. If there is an immediately following error report, the effect is to initiate another programming cycle for the label (or labels) for which a programming attempt has just been made. Such action would be appropriate if the error report were a consequence of noise in the uplink or downlink signalling process.

The interrogator does not have to issue such a report. It has the opportunity to not issue an error report, but instead make a note that a label appears to have been incorrectly programmed, together with a note of the previous data, and a note of the detail of the current non-compliant response. Obviously this will only be done after several attempts to program a label have been made. What we are catering for here is a repeated label programming failure, and we seem to have done all that is possible. Note that the label has not been silenced. It seems better to keep hearing from a non-performing label, than to have it disappear from view.

Obviously the interrogator will not want to get stuck in a cycle where two labels simultaneously are being programmed, and thus give colliding replies an end of the programming operation, which could cause another error signal, which will cause a repeat of the programming process. The simultaneous programming of two labels is an event that is theoretically impossible, as programming will not be entered unless there is clear evidence that only a single label has been identified for programming. Nevertheless, if it does occur, there is the opportunity of giving no error report, after taking note, as above, of the labels previous data content and current non-compliant response. The label or labels will continue to reply and will be unlikely to collide in the future. When they reply separately, they can be re-programmed if that is desired.

The question arises as to what happens to labels newly arrived in the field and which do not know that programming is in progress. If they are not woken up, all is well. If they were to be woken up, it could be by a parameterised wake up command, which says that they should begin listening and should also start their timer of time in the field, but should not yet reply. They can begin replying when an end of programming command is received. Such a development may require the addition of further parameters to the wake up signal.

In a preferred embodiment, in the error field there may be three binary digits. The first digit may indicate whether or not there is an error message. When no decoding or other error has been found, no error message is given, and that fact is reported by making the first digit of the error field a binary zero. However, as it is important that the label ensure that signalling, during the period of a potential error, has been reliable, the second digit of the error field may be given a binary one. Correctness of signalling may be further ensured by making the third digit of the error field an odd parity check bit, i.e. a binary zero.

When a decoding or other error is found, there is an error report, and the first digit of the error field is therefore set equal to one. The second digit reports the error, with the significance that a binary one reports an error. The third digit of the error field is again an odd parity check digit, and will thus be set equal to zero.

The consequence of these rules is that, in this embodiment, the allowed set of signals for the error field is as set out in Table 9 below.

TABLE 9

| ERROR CONDITION | ERROR FIELD |
|---|---|
| Decoding error | 1 1 1 |
| No decoding error | 0 1 0 |

In a preferred embodiment a label, which has in response to an acknowledgment signal in the same signalling period ceased replying, and which receives the decoding error signal, will resume its reply process. Such a label will not act upon any immediately preceding command to go for programming, and other labels will not, in the presence of such a decoding error signal, act upon an immediately preceding command to remain silent during programming of a selected label.

A label, which has ceased replying and which receives no decoding error signal will continue to cease replying.

A label, which has in response to an acknowledgment signal in the same signalling period ceased replying, and which receives an error field which does not conform to these allowed signals, will conclude that there has been an error in the reception by the label of the error field, and will for safety resume its reply process.

In a different preferred embodiment, it is recognised that to achieve improved functionality under the existing (as at 13 Feb. 2000) FCC regulations the sparse signalling defined below is used.

The sparse signalling may provide data defined by the sizes of gaps between marks provided by dips as defined in FIG. 3.

It may be shown that, if each gap defines two bits of data, sparse signalling is a factor of approximately 2.7 times more efficient than the signalling defined in FIG. 2.

The importance of sparse signalling is that the electromagnetic compatibility limits which apply to Broadband signalling operate to limit the number of dips of the type defined in FIG. 3 which may be offered per second. Since sparse signalling uses fewer dips for a given amount of information, more information may be conveyed to the label within electromagnetic compatibility limits.

In sparse signalling, at the end of a completed reply, there may be a single dip. This dip may be of the same form as for a next slot signal, but may be interpreted differently by the label in the different context. It will serve as a beginning of signalling marker for following interrogator signals, and as an end of slot marker for all labels.

There may or may not be a strength report. If there is one, it requires anther dip so that a space between dips can be detected.

Unless there is a command or error report to be given, this signal is the only one to be received by a label.

A label (or labels) which has just replied will turn off, but will be turned on again if a decoding error is signalled in a way shortly to be described.

If there is a command or error report to be given, there may be another dip after a time delay which specifies the command. A null command (perhaps nil or one time delay) may be needed for the case when an error report only is to be given.

If there is an error report it may come in three varieties. One may report an error for the label just read. The second may report an error for the label read in the preceding slot. The third may report an error in both of those slots.

Thus there may be a single pulse at the end of a successful read, two pulses if it is wished to give a command after a successful read, and three pulses when it is wanted to report an error, with or without a command. This is quite economical signalling, and with label replies of the expected duration, would be compliant with existing FCC regulations.

It is remarked that to achieve secure collision detection there may be performed, during the reply slot which follows the receipt of a reply, upon a record of the data which was received during that reply, signal processing operations described below.

These operations include the steps of: (1) from the decoded reply, constructing an estimate of the analog signal which should have led to that reply; (2) subtracting an amplitude and phase adjusted version of that reply from the actual reply record with the parameter adjusted to minimise the residual; and (3) examining the residual for either too great a noise level or evidence of a second reply.

If too great a residual is found it is considered that the evidence that only one reply was received is unreliable, and an error pertaining to the reply slot preceding the just completed reply slot may be signalled.

It may be noted that this method of collision detection is efficient in relation to others which have been proposed elsewhere in that it does not carry a burden from including, in the reply, a high level of redundancy in the reply information signalled, as such other systems do.

The minimum command set which is required in this abbreviated signalling is: spread out; close in; go for programming; end of programming; change modulation and complete reset, i.e. six commands. Two gaps between pulses, each gap defining two bits, would provide for sixteen commands, and would create scope for a variety of new modulations.

When a label is sent a go for programming command, it could apply to all labels which have just been read, or to more labels. As there will have to be much data to follow, it could be specified which in the data.

The data as well as any programming mode can be specified as a series of bytes at the rate of 160 bytes per second if five dips are employed, which have four gaps between them, to signal four pairs of bits. At that rate under the regulations eight such bytes can be signalled in 50 ms. That is a not unreasonable programming time.

One would want to be sure that these groups of five dips are all distinguishable from a turn on signal. This may be done by using a signifier in front of them, or constructing them so that they always begin differently.

It will be appreciated that alterations, modifications and/or additions may be introduced into the construction and arrangements of parts previously described without departing from the spirit or ambit of the present invention.

What is claimed is:

1. An electronic label reading system, comprising:
an interrogator including a transmitter for generating an interrogation signal and a receiver;
a transmitter antenna connected to said transmitter for generating from said interrogation signal an interrogation electromagnetic field through which objects possessing code responding labels may pass;
said code responding labels including receiving antennas for receiving from said interrogation field a label interrogation signal, said code responding labels being configured to generate label reply signals and, from said label reply signals, label reply electromagnetic fields; and
a receiver antenna connected to said receiver for receiving said label reply signals from said label reply fields, said receiver being configured to detect and decode the label reply signals;
wherein
said interrogation field and label reply fields provide a communication channel from said labels to said interrogator;
said interrogator is configured to transmit reply enabling signals to said labels before said labels are enabled to reply;
each label reply signal contains a precursor portion separated from a remaining portion of the label reply signal by a predetermined gap; and further signals from said interrogator determine which labels of all labels present in the interrogation field that have replied with the precursor portion are enabled for further communication between themselves and said interrogator.

2. The electronic label reading system as claimed in claim 1, wherein data indicative of strength of the label interrogation signal experienced by each label is in at least one of the precursor portion and the remaining portion of the label reply signal of said label.

3. The electronic label reading system as claimed in claim 1, wherein the structure of said precursor portion follows rules whereby precursor signals with different information content combine in said communication channel to produce a violation of said rules.

4. The electronic label reading system as claimed in claim 1, wherein the label reply signals occupy defined time slots.

5. The electronic label reading system as claimed in claim 4, wherein said time slots are determined by said interrogator.

6. The electronic label reading system as claimed in claim 4, wherein the interrogator is configured to generate signals that cause the labels to close the existing time slots, which contain no label reply signals or contain colliding label reply signals, and to commence the timing of new reply slots.

7. The electronic label reading system as claimed in claim 1, wherein the labels have predetermined periods in which said labels enter a listening mode during which there is no label reply signal and during which the labels seek to detect signals from said interrogator.

8. The electronic label reading system as claimed in claim 4, wherein the labels alternatively enter into an active state in which they will reply at a future time and a retired state in which they will not reply at the future time.

9. The electronic label reading system as claimed in claim 8, wherein a label which has just replied moves to the retired state after replying.

10. The electronic label reading system as claimed in claim 8, wherein said interrogator transmits an error-in-decoding signal in the event that said receiver fails to decode a label reply signal.

11. The electronic label reading system as claimed in claim 10, wherein a label which has just replied and moved to the retired state moves to the active state upon receiving the error-in-decoding signal from the interrogator.

12. The electronic label reading system as claimed in claim 1, wherein said interrogation signal includes the reply enabling signals or reply acknowledgment signals.

13. The electronic label reading system as claimed in claim 6, wherein a single dip in amplitude of the interrogation signal can be interpreted by a label as a signal to close the existing time slot or to commence the timing of a new reply slot.

14. The electronic label reading system as claimed in claim 8, wherein the labels resume replying on receiving an error signal from the interrogator.

15. The electronic label reading system as claimed in claim 14, wherein said error signal is transmitted by the interrogator in response to a collision between label reply signals from two or more of said labels.

16. The electronic label reading system as claimed in claim 4, wherein variation of the direction of the interrogation field occurs after a predetermined number of time slots.

17. The electronic label reading system as claimed in claim 16, wherein the behavior of the labels is regulated by status information maintained within the labels, and said labels contain memory cells which preserve said status information during the period of variation of the direction of the interrogation field, or the period of movement of said labels through a region where the interrogation field is weak.

18. The electronic label reading system as claimed in claim 1, wherein the label reply signals contain data useful for theft detection.

19. The electronic label reading system as claimed in claim 1, wherein said further signals include an absence of a transmission from the interrogator.

20. The electronic label reading system as claimed in claim 1, wherein a signal from said interrogator establishes commencement of a label reply period and wherein a signal from said interrogator establishes probability that a label will reply in said period.

21. The electronic label reading system as claimed in claim 1, wherein said precursor is structured to enhance detection of collisions between label reply signals from labels having widely different label reply signal strengths.

22. The electronic label reading system as claimed in claim 1, wherein said precursor includes a random element.

23. A method of reading, by means of an interrogator, a plurality of labels each having internal data, said method comprising the steps of:
    the interrogator transmitting an interrogation signal to the labels to provide powering and communication signals thereto;
    the labels replying with label replies containing their internal data at generally different times;
    each label reply including a precursor portion separated from a remaining portion of the label reply by a predetermined gap;
    said interrogator transmitting reply enabling signals to said labels before said labels are enabled to reply; and
    said interrogator further signaling to said labels to determine which labels of all labels that have replied with the precursor portion are enabled for further communication between themselves and said interrogator.

24. The method according to claim 23, comprising said labels replying in defined time slots.

25. The method according to claim 23, comprising said labels alternatively entering into an active state in which they will reply at a future time and a retired state in which they will not reply at the future time.

26. The method according to claim 25, comprising a label which has just replied moving to the retired state after replying.

27. The method according to claim 23, comprising said interrogator detecting an end of a label reply and acknowledging the end of the label reply by transmitting an acknowledgement signal containing a representation of the strength of the powering signal received in the label reply being acknowledged.

28. The method according to claim 27, comprising a label which has just moved to the retired state, moving back to the active state if the strength of the powering signal received from the interrogator does not match the strength of the powering signal included in its just completed label reply.

29. The method according to claim 25, comprising said interrogator decoding at least one of the label replies, and if a failure to decode said at least one label reply occurs, transmitting an error-in-decoding signal.

30. The method according to claim 29, comprising the label which has just replied, moved to the retired state, and received the error-in-decoding signal, moving back to the active state.

31. The method according to claim 23, comprising said interrogator transmitting an error-in-decoding signal if said interrogator detects a collision between one or more of the label replies.

32. The method according to claim 25, comprising a label which loses its powering signal during a decoding period re-entering the active state when its powering signal is restored.

33. The method according to claim 23, comprising said interrogator detecting an end of a label reply via a drop in signal level at an input of a receiver associated with said interrogator.

34. The method according to claim 23, wherein said further signaling includes an absence of a transmission from the interrogator.

35. The method according to claim 23, wherein a signal from said interrogator establishes commencement of a label reply period and wherein a signal from said interrogator establishes probability that a label will reply in said period.

36. The method according to claim 23, wherein said precursor is structured to enhance detection of collisions between label replies from labels having widely different label reply strengths.

37. The method according to claim 23, wherein said precursor includes a random element.

38. A method of reading, by means of an interrogator, a plurality of labels each having internal data, said method comprising the steps of:

the interrogator transmitting an interrogation signal to the labels to provide powering and communication signals thereto;

the labels replying with label replies containing their internal data at generally different times;

each label obtaining a measure of strength of the powering signal at the time of its reply;

each label reply including a representation of said strength of the powering signal; and said labels alternatively entering into an active state in which they will reply at a future time and a retired state in which they will not reply at the future time.

* * * * *